Patented May 8, 1934

1,957,868

UNITED STATES PATENT OFFICE 1,957,868

CELLULOSE ACETATE COMPOSITION

Charles S. Webber, Springfield, Mass., and Cyril J. Staud, Rochester, N. Y., assignors to Eastman Kodak Company, Rochester, N. Y., a corporation of New York No Drawing. Application December 14, 1929, Serial No. 414,211

5 Claims. (Cl. 106—40)

This invention relates to a cellulose acetate composition and particularly to such a composition containing 1-4 dioxan and alcohol as a solvent.

Cellulose acetate manufacture is generally divided into three stages in which the cellulose is first pre-treated, then acetylated in a bath containing acetic anhydride, acetic acid and a suitable catalyst, and finally hydrolyzed from the cellulose tri-acetate that is formed in the second stage to a cellulose acetate of the acetone soluble type. If the hydrolysis be conducted in a well controlled process, the cellulose acetate produced will be found to be completely soluble in acetone and to contain an acetyl content of from about 38 to 42 per cent. In the preparation of large commercial batches of cellulose acetate, and particularly in the hydrolysis of such a batch, it is often difficult to stop the hydrolysis of the ester at the point where acetone solubility has been reached. Under commercial conditions, the batch may often be hydrolyzed beyond the acetone soluble product, thus producing a cellulose acetate which cannot be dissolved in acetone and therefore is of comparatively little value for the preparation of film, filaments or other commercial products which are manufactured from a solution of the cellulose acetate in acetone.

If precipitated cellulose triacetate or fibrous cellulose triacetate be hydrolyzed in this manner, that is, if the hydrolysis be carried beyond the point in which the fibrous cellulose acetate be found soluble in acetone, upon solution in that solvent it will be found that there are many undissolved fibres in the solution. Expensive filtering operations, therefore, must be conducted in order to fit this cellulose acetate for the usual purposes of commerce. Such operations, of course, entail considerable expense and as a result increase the cost of the final cellulose acetate produced.

An object of the present invention is to provide a solvent combination for cellulose acetate which will dissolve any cellulose acetate having an acetyl content greater than 30 per cent. A further object of this invention is to provide a solvent combination for cellulose acetate comprising 1-4 dioxan and alcohol. Other objects will hereinafter appear.

We have found that 1-4 dioxan and alcohol is a particularly good solvent for all types of cellulose acetate having an acetyl value of greater than 30 per cent. We have likewise found that coating or forming films or sheets of so-called "over-hydrolyzed" cellulose acetate from a solution of 1-4 dioxan and alcohol will result in products having exceptionally good quality and in the most instances, products that are equally as transparent, strong and durable as films or the like prepared from cellulose acetates which have not been hydrolyzed beyond their solubility in acetone. A cellulose acetate, therefore, that has been hydrolyzed in a non-uniform manner, and which is not fully soluble in acetone, can be formed into useful products by first dissolving this ester in a solution of 1-4 dioxan and alcohol.

The alcohols which we have found suitable for use with 1-4 dioxan include, particularly, the lower aliphatic mono-hydroxy alcohols such as methyl and ethyl alcohols and while the higher alcohols of the aliphatic series may be employed, we prefer the lower members thereof. The relative proportions of 1-4 dioxan and the particular alcohol used will be regulated by the type of cellulose acetate and the degree of hydrolysis of the cellulose acetate beyond acetone solubility. By dissolving the ester in a series of solvent mixtures containing say 20–50–80% 1-4 dioxan and 80–50–20% respectively of the alcohol the optimum proportion may be readily determined.

In the preparation of film-forming cellulose acetate compositions from such over-hydrolyzed cellulose acetate, it is generally advisable to have present in the 1-4 dioxan-alcohol solution the usual types of plasticizers such, for example, as triphenylphosphate, orthochloro-naphthalene, triacetin or any of the usual type of plasticizers, with or without the presence of fluid restraining agents such as butyl alcohol, or amyl acetate which may be present to prevent the too rapid evaporation of the more volatile solvents from the composition. Non-solvents such as benzol and toluol or petroleum distillates may likewise be present in the film-forming solution, but not in sufficient amounts to precipitate the cellulose acetate from the solution. While we shall now describe one form of our invention by way of example, it will be understood that we are not restricted thereto except as indicated in the appended claims.

By way of illustration, we may dissolve 100 parts of cellulose acetate which is incompletely soluble in acetone and contains an average acetyl content of 34% in 200 to 400 parts of 1-4 dioxan and 400 to 200 parts of ethanol. By the addition of about 10 to 50 parts of any of the usual plasticizers to such a solution, a film or artificial silk filament may be formed therefrom which will be transparent, flexible and very durable. Such an acetate could not be successfully formed into such products from acetone solution.

Various changes may be made in the proportions of the 1-4 dioxan or the alcohol in the solvent mixture, or in the degree of the deacetylation of the cellulose acetate employed without in any way departing from this invention or sacrificing any of the advantages that may be derived therefrom. It is further to be understood that although the above example refers to artificial silk, it is also applicable to the production of products such as film and other sheets, moulded products, etc.

What we claim as our invention and desire to be secured by Letters Patent of the United States is:

1. A composition of matter comprising cellulose acetate having an average acetyl content falling between 44.8 and 30 percent and at least part of the cellulose acetate having an acetyl content below the minimum necessary to confer acetone-solubility, dissolved in a mixture of 1-4 dioxan and alcohol.

2. A composition of matter comprising cellulose acetate having an average acetyl content falling between 44.8 and 30 percent and at least part of the cellulose acetate having an acetyl content below the minimum necessary to confer acetone-solubility, dissolved in a mixture of 1-4 dioxan and ethanol.

3. A highly flexible, extended body which comprises deposited or flowed cellulose acetate having an acetyl content below the minimum necessary to confer acetone-solubility, the body being deposited or flowed from a solution of the cellulose acetate dissolved in a mixture of 1-4 dioxan and alcohol.

4. A highly flexible, extended body, which comprises cellulose acetate having an acetyl content below the minimum necessary to confer acetone-solubility, the body being formed from a solution of the cellulose acetate dissolved in a mixture of 1-4 dioxan and ethanol.

5. A flowable, film-forming composition comprising 100 parts by weight of cellulose acetate only a part of which is soluble in acetone, dissolved in 2 to 8 parts of a mixture of 1 to 4 parts of 1-4 dioxan and 4 to 1 parts of ethanol.

CHARLES S. WEBBER.
CYRIL J. STAUD.